United States Patent

[11] 3,632,208

[72] Inventor Frederick O. Bach
 Villa Park, Ill.
[21] Appl. No. 878,049
[22] Filed Nov. 19, 1969
[45] Patented Jan. 4, 1972
[73] Assignee A. B. Dick Company
 Niles, Ill.

[54] IMAGE REPRODUCTION DEVICE
 7 Claims, 5 Drawing Figs.
[52] U.S. Cl. ................................................. 355/108,
 355/104
[51] Int. Cl. ................................................ G03b 27/10
[50] Field of Search ................................... 355/108,
 110, 104, 109

[56] References Cited
 UNITED STATES PATENTS
 2,220,526 11/1940 Kluitmann ................. 355/109
 2,427,443 9/1947 Cochran ..................... 355/109 X
 3,085,488 4/1963 Heiart ........................ 355/110 X Primary Examiner—Samuel S. Matthews
Assistant Examiner—Richard L. Moses
Attorney—McDougal, Hersh & Scott ABSTRACT: An image reproduction device using a radiation source mounted in a reflector is aimed at the periphery of a transparent tube encompassing the reflector and the source. A driver belt has a portion of its surface engaging with the tube and moves an original and a copy sheet past radiations from the source. Means are provided to aim and focus the source and to adjust the tracking of the belt.

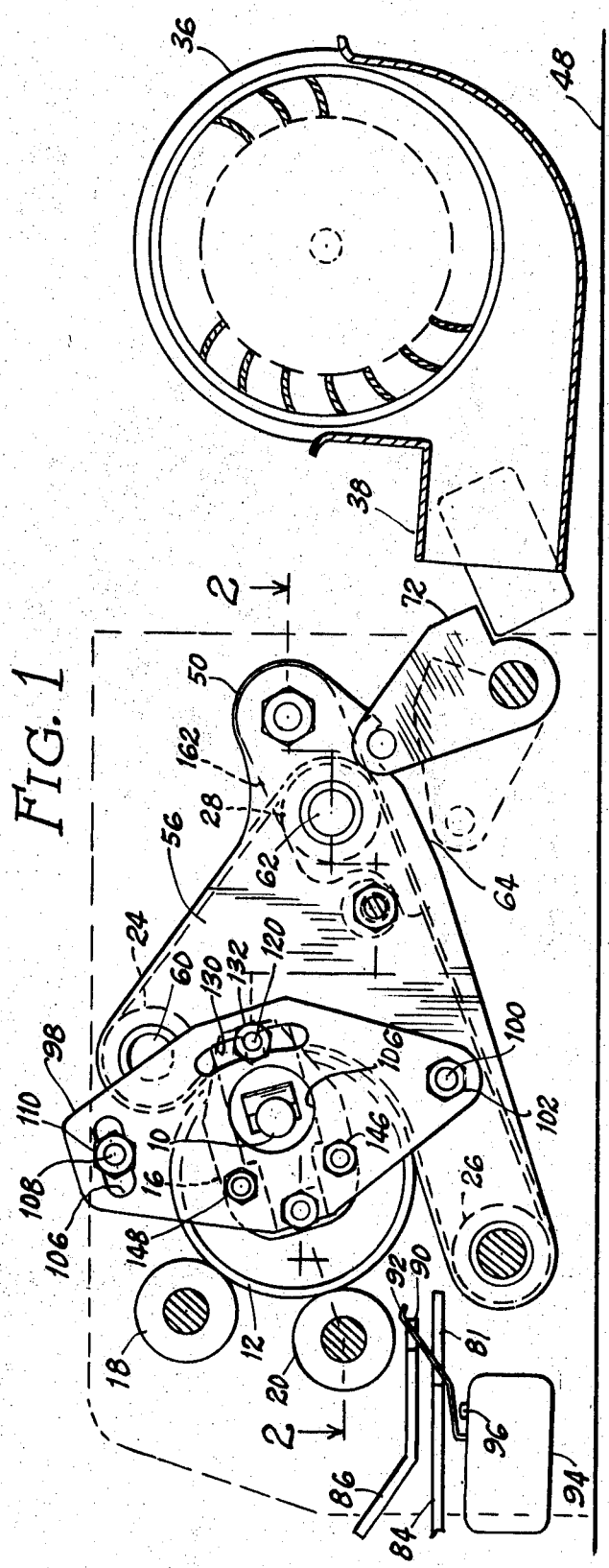

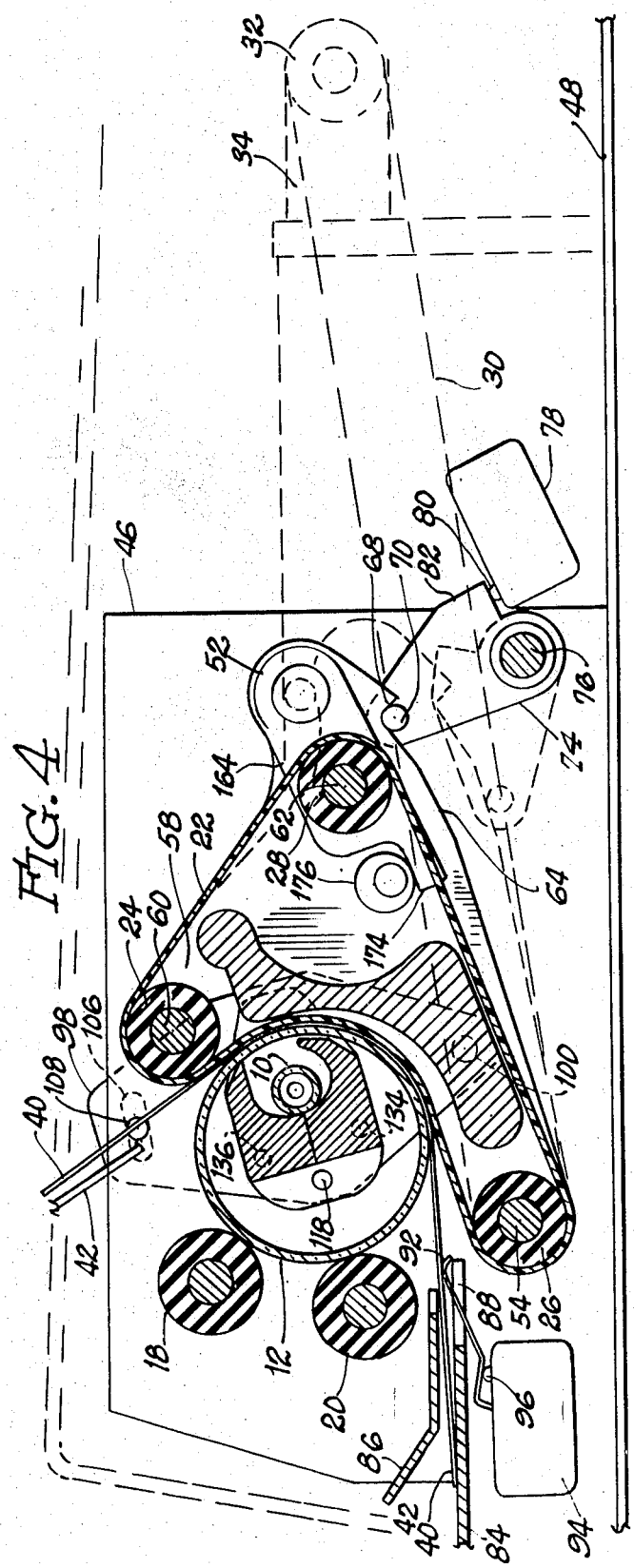
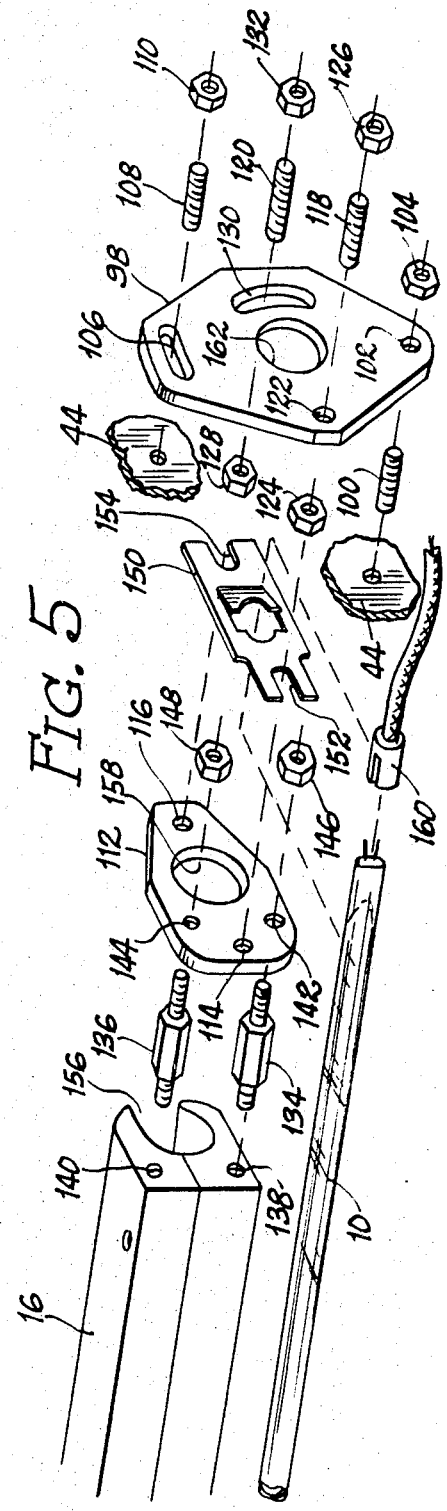

IMAGE REPRODUCTION DEVICE

This invention relates to a device for image reproduction from an original and it relates more particularly to the preparation of an imaged master or transparency by thermographic technique.

In the process for imaging a receptor sheet by infrared radiation of an original, the receptor sheet and the original are adapted to be positioned in surface contact one with the other while radiations rich in infrared are directed onto the original. Radiations are absorbed by the original image containing infrared ray absorbing material and converted into heat to form a heat pattern which transfers to the receptor sheet.

In the preparation of imaged masters and transparencies by thermographic technique, it is desirable to provide for a prolonged exposure with both the original and receptor sheets in intimate contact one with the other, without relative movement therebetween, so that constant registry will be maintained between the original and the receptor sheet during the entire exposure cycle.

In order to obtain copies which are sharp clean reproductions, the aiming and focusing of the radiation on the reception sheet and the original are critical. In addition, it is desirable that the elements permitting the aiming and focusing be adjustable to permit their periodic readjustments. Likewise, it is desirable to provide for the adjustment of the means for transporting the receptor sheet and the original past the radiation source in order to ensure the maintenance of intimate contact between the two.

It is an object of this invention to provide a device for use in the preparation of imaged masters and transparencies by radiation of an original, preferably with radiations rich in infrared.

It is also an object of this invention to provide a device for use in the preparation of imaged masters and transparencies which is capable of reliable operation and may be easily adjusted and maintained.

These and other objects and advantages of this invention will hereinafter appear and for purposes of illustration, but not of limitation, an embodiment of the invention is shown in the accompanying drawing in which FIG. 1 is a side view, partially in section, of the arrangements of elements embodied in the imaging device of this invention;

FIG. 2 is a view along the line 2—2 of FIG. 1 of means supporting the ends of the light source and reflector for angular and radial adjustment;

FIG. 3 is a side view of the adjustable means for supporting the light source and reflector;

FIG. 4 is a side elevation partially in section of the elements embodying the invention; and FIG. 5 is an exploded illustration of the elements of the invention whereby aiming and focusing of the source of radiation may be obtained.

The objectives of this invention have been achieved by the arrangement illustrated in FIG. 1 in which the source of radiations, in the form of elongate tube 10, is mounted within a transparent cylinder 12, such as a tube of Pyrex glass having a diameter within the range of 1 to 5 inches and preferably 2 to 3 inches, but with the transparent cylinder being supported for free rotational movement relative to the stationary light source. The radiations issuing from the source 10 are concentrated by a reflector 16 for directing the radiations from the source through a selected portion of the transparent cylinder 12.

The tube 10, reflector 16 and transparent cylinder 12 are dimensioned to have a length which corresponds to the largest width of original and receptor material that the device is designed to handle so that radiations of uniform concentration crosswise of the device can be directed from the radiation source 10 to the original as it is processed through the machine.

The transparent cylinder 12 is mounted for free rotational movement between two or more spaced backup rolls 18 and 20 which engage spaced peripheral portions of the cylinder opposite a peripheral portion about which a length of the run of a endless belt 22 is wrapped to provide at least a three-point suspension therebetween, with the wrapped portion of the belt 22 in pressure engagement with the peripheral surface of the cylinder to clamp the cylinder between the backup rolls and belt for rotational movement about an axis normal to the engaged periphery of the backup rolls 18 and 20.

The rolls 18 and 20 dimensioned to have a length corresponding to the length of the cylinder, can be plastic rolls, rubber rolls or preferably rubber or plastic coated metal rolls.

The endless belt 22, dimensioned to have a width corresponding to the length of the cylinder 12, is trained about rollers 24, 26 and 28 with a line extending between the axes of the rolls 24 and 26 defining a chord through a section of the cylinder whereby a portion of the belt extending between said rolls wraps about a portion of the cylinder therebetween.

One of the rolls, preferably the roll 26, is adapted to be driven by a belt 30 driven from a pulley 32 rotated by a motor 34 for linear displacement of the belt in one direction while the other supporting rolls 24 and 28 are idler rolls which are mounted at their ends for free rotational movement. As the driving means, it is preferred to make use of a variable drive for adjusting the speed of the belt with corresponding adjustment in the amount of exposure.

A crossflow blower 36 is mounted to extend lengthwise of the belt adjacent the back run of the belt with the nozzle 38 of the blower aimed at the surface of the belt to direct a continuous stream of cold air onto the belt for removal of heat after the belt disengages from the cylinder 12 but before reengagement with said cylinder.

In operation, cold air is directed onto the belt for heat removal. As the belt is displaced in one direction by the driving motor the cylinder 12, which is freely suspended between the belt and the backup rolls, is turned by the belt for rotational movement at a peripheral speed which is identical with the linear speed of the belt such that relative movements between the belt and the engaged portion of the cylinder is avoided.

As may be seen in FIG. 4, the master 40 and the original 42 are introduced into the nip between the belt and cylinder at the ingoing end with the original in front of the master. The sheet assembly is gripped between the cylinder and the wrapped portion of the belt positively to carry the two together about the wrapped portion of the cylinder with the belt constantly pressing the sheets tightly against one another and onto the face of the cylinder throughout their travel about the wrapped portion of the cylinder.

The radiation source 10 and reflector 16 are arranged to direct the radiations onto the wrapped portion of the cylinder for passage therethrough to the sheet assembly for prolonged exposure of the original to the concentrated radiations for development of a heat pattern which transfers from the original to the master in immediate contact therewith.

In the case of an assembly of an original and transparency, the preferred arrangement is to position the transparency in front of the original so that the concentrated radiations reflected from the lamp source 10 will travel through the transparent cylinder 12 and the transparency to the original 34 for development of the best pattern which then travels back to the transparency for image reproduction.

The device described is preferably adapted for use in the thermographic process which relies upon radiations having high concentration of infrared for absorption and heat development in the original. It will be apparent, however, that other photocopy processes which depend upon radiations which are absorbed in the original for the development of an image pattern can also be adapted for use in a device of the type described for copy reproduction.

The described arrangement offers a number of advantages, particularly in the thermographic technique for reparation of imaged masters or transparencies:

1. Temperature build up in the belt can be prevented in a simple and efficient manner by the blower which directs cold air onto the belt surface during a portion of travel of the belt remote from the exposure area and over a large proportion of the length of the travel of the belt. To minimize the amount of heat required to be removed from the belt, it is preferred to fabricate the belt with a reflective surface, such as with a white or light surface which reflects rather than absorbs radiations. A belt formed of rubber, metal or plastic material such as Mylar (a polyester) or Teflon (a polyfluorinated ester) and the like, with or without a reflective metallized or painted surface, can be used.

2. The arrangement permits a large amount of energy from the radiation source to be concentrated on the original over a variable length of time for generation of the heat pattern for image reproduction.

3. The transparent cylinder is readily accessible for cleaning to remove dirt or other foreign material from the peripheral surfaces thereof which are engaged by the belt and sheet assemblies thereby to avoid specking in the copy and thereby to maximize penetration of radiations for uniform reproduction.

4. The actuation of the cylinder by the belt for rotational movement together insures coordination independent of variation in linear speed of the belt so that there is little, if any, possibility of slippage between the original and receptor sheets or between the sheet assembly and the cylinder thereby to avoid nonuniformities of exposure.

5. The wrap of the belt about a portion of the cylinder for pressure engagement provides for uniform pressure throughout the wrap between the assembled original and receptor sheets and the peripheral surface of the cylinder thereby to provide greater uniformity in the reproduction or imaging process.

Referring again to FIG. 4 the supporting and adjustment means comprise a pair of main side plates 44 and 46 on either side of a base 48. A pair of belt support side plates 50 and 52 are pivotally mounted on a shaft 54 extending between the main side plates 44 and 46 which also provides support for the roll 26. The belt support side plates are each formed with extensions 56 and 58, respectively, which provide support for a shaft 60 carrying the roll 24 for rotation and the ends opposite their pivoted ends support a shaft 62 carrying the roll 28 for rotation and will be explained in detail hereinafter.

The lower surfaces of each belt support side plate 50 and 52 is provided with a sloped camming surface 64 terminating in notch 68. The camming surface and the notch are adapted to be engaged by cam element 70 carried on a pair of spaced cam levers 72 and 74 mounted to a shaft 76 rotatably carried by the main side plates 44 and 46. The shaft 76 extends through the main side plate 44 and is provided with a suitable handle (not shown) so that it may be rotated through an arc.

By virtue of this construction when it is desired to place the device in a nonuse position the shaft 72 may be rotated counterclockwise as shown in the drawings. When so rotated, the camming element 70 moves from the notch 68 along the camming surface 64. The movement of the camming element from the notch 68 along the camming surface 64 permits the belt support side plates to rotate clockwise as shown in the drawing about the shaft 54. As they rotate, that portion of the belt 22 which had been in pressure engagement with the peripheral surface of the transparent cylinder 12 moves away from that surface relieving that pressure. The belt support side plates 50 and 52 and cam levers 72 and 74 assume the dotted line position shown in FIG. 4. With the belt pressure removed from the transparent cylinder 12 the machine is on off condition and service and maintenance can be performed if that be necessary. When the shaft 76 is rotated in a clockwise direction, as shown in the drawing, the belt support side plates 50 and 52 are rotated counterclockwise by the action of the camming element 70 on the camming surface 64 to move the belt 22 to a position of pressure engagement with the surface of the transparent cylinder.

A switch 78 mounted in the device is arranged to its actuating plunger 80 engaged by a shoulder 82 on one of the cam levers 72 or 74. The switch is connected in the circuits for various elements and may be used to close a circuit supplying electricity to the radiation source 10 and motor for the blower 36.

A pair of spaced flat guide elements 84 and 86 extend transversely between the main side plates 44 and 46 to receive the master 40 and the original 42 when inserted by a user. Slots 88 and 90 are provided along the length of each guide element to receive a spring arm 92. The spring arm has one end extending in an upward direction while its other end is secured to the body of a switch 94. When a master and an original are inserted between the guide elements 84 and 86, they engage and depress the spring arm 92 which in turn depresses a plunger 96 closing the switch 94. The closure of this switch permits energization of the motor 34 and consequent movement of the driving belt 30 and in turn movement of the belt 22 over the surface of the transparent cylinder 12. The assembly of master and original are inserted until they engage in the nip formed by the belt 22 and cylinder 12 and are carried around the cylinder where they are exposed to radiations from the source 10 and discharged from the device.

In order to provide for the aiming and focusing of the radiation source 10, the device includes means for permitting lateral movement of the source and angular adjustment of its reflector 16.

This, means, as shown in FIG. 5, includes a pair of angular adjustment support plates 98, only one of which is shown mounted on the main side plates 44 and 46. Each support plate is attached to its respective side plate by a screw 100 threaded into that plate and passing through a hole 102 in the lower end of the support to be engaged by nut 104. The upper end of the support is provided with an arcuate slot 106 through which a screw 108 passes to engage in a side plate and which has a nut 110 threaded on its end. By loosening the nuts 104 and 110 the support plates may be rotating about the screw 100 as a shaft with the plate being able to move by virtue of the engagement of the screw 108 in the slot 106.

A pair of adjustment plates 112, only one of which is shown, are mounted on the support plates 98. Each adjustment plate is provided with a pair of threaded holes 114 and 116. A pair of screws 118 and 120, respectively, are threaded into the hole 114. The screw 118 passes through a hole 122 in a support plate 98 and carries a first nut 124 on one side of the support plate and a second nut 126 on the other side of the support plate. Likewise, the screw 120 engages in the threaded hole 116, carries a nut 128 passes through a second arcuate slot 130 in the support plate and carries a nut 132 to the outer side of that plate. By loosening the nuts 126 and 132 the adjustment plates 112 may be rotated with the screw 118 functioning as an axis of rotation in hole 122 and the screw 120 moving in the slot 130. Because the support plates may be similarly moved on the main side plates angular adjustment in two plates substantially at right angles to each other is possible.

The reflector 16 is mounted on the adjustment plate 112 by means of rods 134 and 136 threaded at each end. One threaded end of each rod 134 and 136 engages in threaded holes 138 and 140 respectively in the body of the reflector. The other threaded end of each rod passes through holes 142 and 144 in the adjustment plate and are engaged by nuts 146 and 148. When the nuts 146 and 148 see FIG. 3 are tightened, the reflector 16 is supported by the angular adjustment plates 112 and in turn the support plates 98 on the side plates 44 and 46. Thus, rotation of the support plates 98 and angular adjustment plates will permit translation of the reflection on the arc of travel by the support plate as it rotates and permit angular adjustment along the arc. In this manner, the reflector and the radiation source may be aimed to precisely the location desired.

In order to provide for transverse movement or focusing of the radiation source, it is supported in a pair of spring fasteners 150, only one of which is shown. Each spring fastener is provided with a pair of longitudinal slots through which the screws 118 and 120 pass. The spring fastener is supported against the adjustment plates 112 and when the nuts 124 and 128 are loosened may be moved longitudinally. The radiation source 10 lies in the cavity 156 of the reflector and its ends pass through openings 158 in the adjustment plates to be engaged held firmly by the struck out spring fingers 158 on the spring fasteners. Thus, when the spring fasteners are moved, the radiation source is likewise moved and in this manner may focus accurately upon the desired point where the master and the original contact the transparent tube 16.

Electrical connections to the radiation source may be made by a connector 160 passing through an opening 162 in the support plate to engage electrical contacts on the end of the source.

In addition to the need for providing the aiming and focusing of the radiation, there is also need to provide for accurate tracking of the belt 22. To this end each belt support 50 and 52 carries a tracking adjustment arm 162 and 164. The arms 162 and 164 are mounted on the belt supports by a screw 166 having a threaded portion 168 receiving a nut 170. The shaft 62 is rotatably mounted in a bearing 172 held in the adjustment arm by a press fit to rotatably mount the roll 28. Each arm is provided with a forward camming surface 174 which is in contact with an eccentric cam 176 held by a positioning screw 178 in the belt plate 50. As the screw 178 is rotated, the cam 176 rotates to depress or permit the elevation of its associated cam arm. By depressing or raising the cam arm on each side the tracking of the belt over the rolls can be adjusted by tilting the roll in order that it travel in the path desired, that is, one which assures a straight travel of the master and the original through the machine.

While the invention has been described in connection with a particular embodiment thereof, it is desired to cover by the appended claims all variations which come within the scope of the invention as set forth in those claims.

What is claimed as new and desired to be secured by Letters Patent of the United States is:

1. An image reproduction device comprising a radial source, a reflector encompassing a portion of said radiation source, a transparent tube encompassing said reflector and said source, backup rolls supporting said tube for rotation, a movable belt having a portion in pressure engagement with said transparent tube, angular adjusting means mounting said reflector, longitudinal adjusting means mounting said source, and means for guiding an original and a receptor sheet between said tube and said belt whereby said tube and belt will move them pass said source so that radiation therefrom will form a heat pattern on the receptor sheet.

2. The image reproduction device of claim 1 wherein said angular adjusting means comprises means for moving said source and said reflector on an arcuate path and means for angularly adjusting said reflector and said source on the path.

3. The image reproduction device of claim 1 wherein said longitudinal adjusting means comprises movable means supporting said source.

4. An image reproduction device comprising a radiation source, a reflector encompassing a portion of said radiation source, a transparent tube encompassing said reflector and said source, backup rolls supporting said tube for rotation, a movable belt having a portion in pressure engagement with said transparent tube, means supporting said belt for movement comprising a rotatable means movable toward and away from said tube, means for adjusting said source and said reflector, and means for guiding an original and a receptor sheet between said tube and said belt whereby said tube and belt will move them pass said source so that radiation therefrom will form a heat pattern on the receptor sheet.

5. The image reproduction device of claim 4 wherein said means supporting said belt includes a plurality of spaced rolls.

6. The image reproduction device of claim 5 including a pair of spaced plates supporting said rolls for rotation.

7. The image reproduction device of claim 6 including tiltable means supporting one of said spaced rolls on said spaced plates.

* * * * *

UNITED STATES PATENT OFFICE
CERTIFICATE OF CORRECTION

Patent No. 3,632,208            Dated January 4, 1972

Inventor(s) Frederick O. Bach

It is certified that error appears in the above-identified patent and that said Letters Patent are hereby corrected as shown below:

Column 4, line 64, after "148.", See Fig. 3. has been omitted; and

Signed and sealed this 26th day of December 1972.

(SEAL)
Attest:

EDWARD M. FLETCHER, JR.            ROBERT GOTTSCHALK
Attesting Officer                  Commissioner of Patents

UNITED STATES PATENT OFFICE
CERTIFICATE OF CORRECTION

Patent No. 3,632,208    Dated January 4, 1972

Inventor(s) Frederick O. Bach

It is certified that error appears in the above-identified patent and that said Letters Patent are hereby corrected as shown below:

Column 6, line 1, "radial" should read -- radiation -- .

Signed and sealed this 15th day of May 1973.

(SEAL)
Attest:

EDWARD M. FLETCHER, JR.　　　　　　　　ROBERT GOTTSCHALK
Attesting Officer　　　　　　　　　　　　Commissioner of Patents